(12) United States Patent
Boch et al.

(10) Patent No.: US 6,445,926 B1
(45) Date of Patent: *Sep. 3, 2002

(54) USE OF SECTORIZED POLARIZATION DIVERSITY AS A MEANS OF INCREASING CAPACITY IN CELLULAR WIRELESS SYSTEMS

(75) Inventors: Erik H. Boch, Stittsville (CA); Bernard Herscovich, Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/170,723

(22) Filed: Oct. 14, 1998

Related U.S. Application Data

(63) Continuation-in-part of application No. 09/073,217, filed on May 6, 1998, now Pat. No. 6,205,337.

(51) Int. Cl.$^7$ .................. H04Q 7/20; H04Q 7/00; H04B 1/38
(52) U.S. Cl. ............... 455/447; 455/562; 370/328
(58) Field of Search ................. 455/561, 562, 455/447, 454, 450, 101, 500, 422; 370/328, 338; 343/797

(56) References Cited

U.S. PATENT DOCUMENTS

| | | | | |
|---|---|---|---|---|
| 4,633,463 A | * | 12/1986 | Mack | 370/333 |
| 4,723,321 A | * | 2/1988 | Saleh | 455/295 |
| 5,212,830 A | * | 5/1993 | Miller | 455/447 |
| 5,649,287 A | * | 7/1997 | Forssen et al. | 370/312 |
| 5,668,610 A | | 9/1997 | Bossard et al. | |
| 5,717,691 A | * | 2/1998 | Dighe et al. | 370/401 |
| 5,737,698 A | * | 4/1998 | Gabrielian et al. | 455/286 |
| 5,760,740 A | * | 6/1998 | Blodgett | 342/362 |
| 5,771,449 A | * | 6/1998 | Blasing et al. | 455/422 |
| 5,822,309 A | * | 10/1998 | Ayanoglu et al. | 370/315 |
| 5,838,670 A | * | 11/1998 | Billstrom | 370/328 |
| 5,903,826 A | * | 5/1999 | Nowak | 455/277.1 |
| 5,940,044 A | * | 8/1999 | Smith | 343/810 |
| 5,949,793 A | * | 9/1999 | Bossard et al. | 370/487 |
| 5,977,929 A | * | 11/1999 | Ryken | 343/797 |
| 6,006,069 A | | 12/1999 | Langston | 455/62 |
| 6,025,798 A | * | 2/2000 | Colombel et al. | 342/361 |
| 6,057,806 A | * | 5/2000 | Lopez | 343/890 |
| 6,112,056 A | * | 8/2000 | Langston | 455/62 |
| 6,151,513 A | * | 11/2000 | Petry et al. | 455/562 |
| 6,205,337 B1 | * | 3/2001 | Boch | 455/447 |
| 6,304,762 B1 | * | 10/2001 | Myers et al. | 455/422 |

* cited by examiner

*Primary Examiner*—Nguyen T. Vo
*Assistant Examiner*—Charles N. Appiah
(74) *Attorney, Agent, or Firm*—Marks & Clerk

(57) ABSTRACT

A system and method for increasing the use of frequency licenses in a cellular, multipoint wireless access system with non-mobile customer sites. The cell coverage of a base station is divided into sectors, for example 4, and orthogonal polarization between adjacent sectors is employed. For bi-directional communication uplink and downlink signals within each sector also employs orthogonal polarization.

11 Claims, 5 Drawing Sheets

USE OF SECTORIZED POLARIZATION DIVERSITY AS A MEANS OF INCREASING CAPACITY IN CELLULAR WIRELESS SYSTEMS

RELATED APPLICATION

This is a continuation-in-part application of Applicant's U.S. application Ser. No. 09/073,217 filed May 6, 1998 now U.S. Pat. No. 6,205,337.

FIELD OF THE INVENTION

This invention relates to cellular wireless communication systems and more particularly to a system and method for increasing utilization of an allocated frequency in a fixed cellular wireless system.

1. Background

Traditionally, cellular wireless communication systems have focused on mobile telephony and wireless local area network (LAN) communications. In such systems a base station at a fixed location has an omni-directional antenna for bi-directional communication with a mobile terminal as it travels throughout the cell area covered by the base station. The terminal also has an omni-directional antenna to enable reception of communication regardless of location within the cell. Omni-directional receivers tend to be relatively polarization insensitive.

Microwave radio frequencies in the GHz range are being allotted to wireless service providers through allocated frequency licenses. A license will conventionally cover a frequency range and the licensee will attempt to optimize utilization of the range through frequency multiplexing (so-called frequency plans) whereby the frequency range is subdivided into narrow bands or channels. Notwithstanding this subdivision it is to a licensee's advantage to optimize utilization of each frequency within the allocated frequency range.

In broadband communication of the type contemplated by the present invention, for example asynchronous transfer mode (ATM) networks or Internet Protocol (IP) networks, both the base station which serves as an ATM switch and usually the customer or user at a remote site are in a fixed location. This factor allows the utilization of directional transceivers at both the base station and the remote site.

2. Prior Art

U.S. Pat. No. 5,668,610 which issued Sep. 16, 1997 to Bernard Bossard et al. and assigned to Cellularvision Technology & Telecommunications, L.P. describes a transmitter array utilizing polarization diversity sub-cells. In this patent a directional antenna is utilized for transmitting television signals to a substantially circular cell area. The central base station utilizes a directional transmitter such that the cell area is divided into two substantially equal sectors. Transmission in one sector is vertically polarized whereas transmission in the second half of the cell is horizontally polarized. The receivers in each sector are configured to accept the type of polarization directed to it and to reject the opposite type of polarization. This, if effect, substantially doubles the utilization of each frequency.

SUMMARY OF THE INVENTION

The present invention takes advantage of the polarization diversity described in U.S. Pat. No. 5,668,610 by utilizing transceivers at the base station which divides the cell area into more than two sectors. This results in greater use of a frequency allocation by multiplying the utilization of each frequency by the number of sectors employed up to a practical limit of between 2 and 8 (typically 4). This is referred to frequency reuse. In the present invention the polarization in each sector is orthogonal to the polarization in each adjacent sector.

Additionally, the present invention contemplates bi-directional communication between the remote site and the base station. The polarization for transmission in each direction is also orthogonal such that, for example, radiation between the base station and the remote site (downstream or downlink) is vertically polarized while radiation from the remote site to the base station (upstream or uplink) is horizontally polarized. Radiation in adjacent sectors is reversed.

In this way, the utilization of the frequency license is increased by a factor of N or 4 in the aforementioned four-sectored cell.

Also contemplated by the present invention is orthogonal polarization wherein the radiation in the receive and transmit directions are, for example, at linear +45 degrees and linear 45 degrees, respectively. This orthogonal relationship leads to improved bi-directional system performance against rain fade.

Therefore, in accordance with a first aspect of the present invention there is provided a cellular wireless communications system comprising a base station having a transceiver for communications with a remote site over a wireless link, the transceiver having transmission means to generate N sectored radiation patterns where N is greater than 2 and the sum of the sectored patterns covers cell area; and transceiver means at the remote site, the remote site being at a location within one of the sectors and the transceiver means having a directional antenna aimed at the base station for receiving transmissions therefrom. Radiation within the one of the sectors is orthogonally polarized with respect to radiation in adjacent sectors.

In one embodiment of the invention the cell area is substantially circular and N is an even number, preferably four. Additionally, the remote site is in a fixed location and communication between the base station and remote site is bi-directional.

According to a further preferred embodiments of the invention the cellular wireless communication system is for broadband communication utilizing an asynchronous transfer mode (ATM) network or an IP network.

In accordance with a second aspect of the present invention there is provided a method of increasing the utilization of a defined frequency in a cellular wireless communication system for bi-directional communication between a base station and a remote site over a wireless link. The method comprises: providing a transceiver at the base station having means to generate N sectored radiation patterns where N is greater than 2 and the sectored patterns combine to cover a cell area; providing a transceiver at the remote site located in one of the sectors, the transceiver having a directional antenna aimed at the base station for receiving radiation-transmitted therefrom; and employing orthogonally polarized radiation between adjacent sectors.

BRIEF DESCRIPTION OF THE DRAWINGS

The invention will now be described in greater detail with reference to the attached drawings wherein.

DETAILED DESCRIPTION OF THE INVENTION

Figure 1:
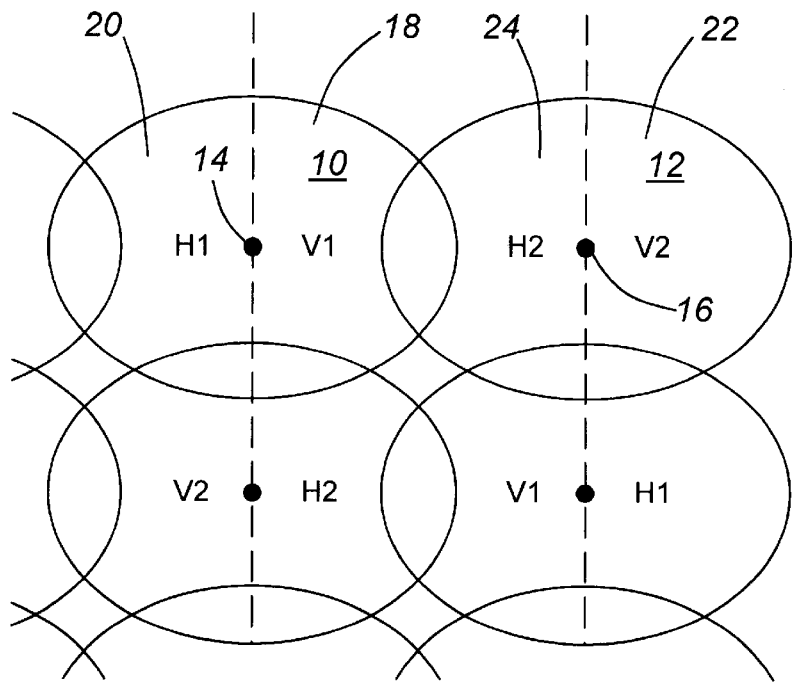
FIG. 1 is a plan view of a cellular array having a two-sectored cell according to the prior art.

Polarization diversity according to the prior art and as disclosed in U.S. Pat. No. 5,668,610 effectively doubles frequency utilization in a cellular system. In the prior art an antenna at the base station provides a sectored radiation pattern wherein the circular cell is divided into two substantially equal sectors. Polarization diversity is employed between the two sectors. In order to guard against overlap between cells different frequencies are used in adjacent cells. This is illustrated in the plan view of a cellular array shown in FIG. 1.

As shown, each circle 10, 12 represents the cell area covered by transmitter stations 14, 16. Each of the transmitters 14, 16 operates at a different frequency. Radiation in one sector 18 of cell 10 is vertically polarized while the radiation in sector 20 is horizontally polarized. Similarly, radiation from transmitter 16 operating at a different frequency than transmitter 14 employs vertical polarization over sector 22 and horizontal polarization over sector 24.

Figure 2A:
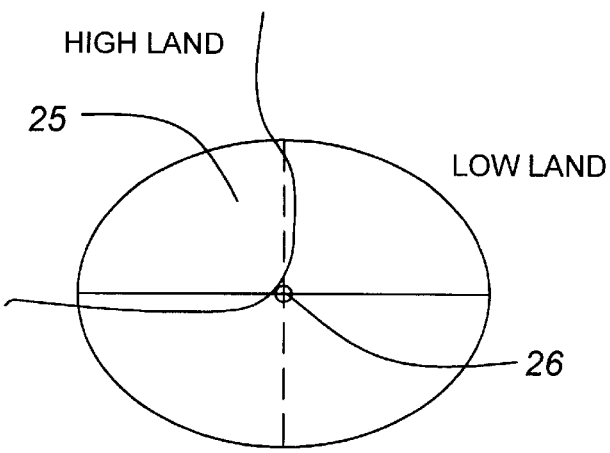
FIGS. 2A and 2B show an advantage of a four sectored cell in relation to variations in the terrain.
Figure 2B:
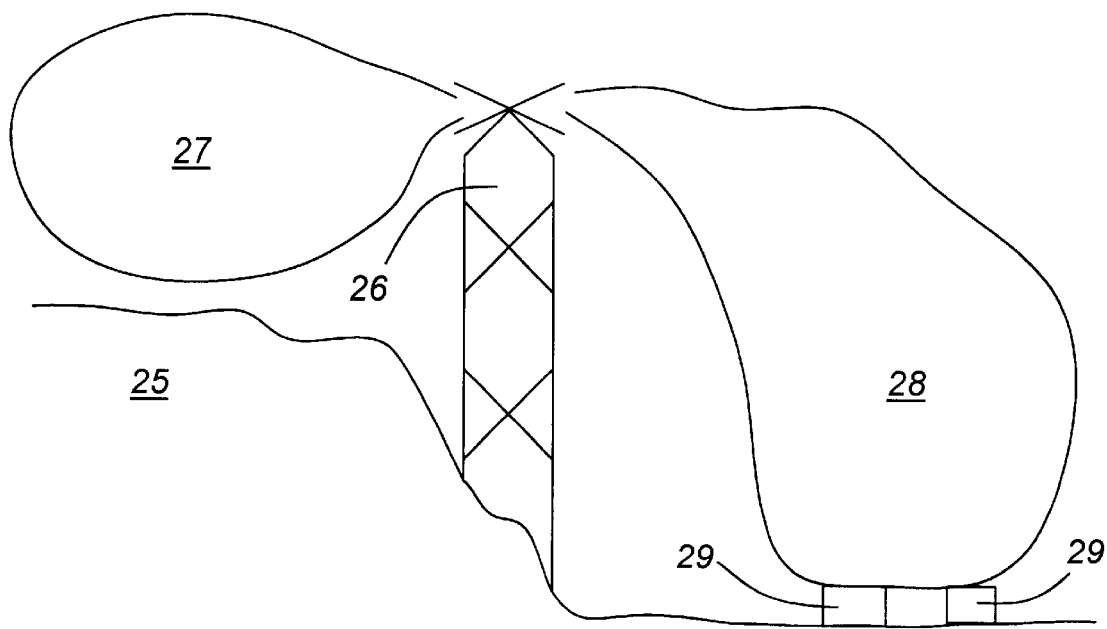

The polarization diversity concept of the prior art is applied to the present invention by segmenting the cell area into N sectors where N, is greater than 2 and preferably 4. It has been determined that a two-sector cell does not adapt as well as a four-sector cell to the structural variations and/or obstructions in the geographic area covered by the cell. In this regard, FIG. 2A is a plan view of a four-sectored cell with a significant difference in elevation between sectors. As shown, the edge of a hill falls along the boundary between sectors with sector 25 being a high land area and the remaining sectors being in a low land area. FIG. 2B is a side view of the cell area of FIG. 2A showing the base station 26 and a non-tilted beam pattern 27 covering area 25. As shown if FIG. 2B the beam pattern 28 for the low land area is tilted downwards to cover sites 29. A four-sector arrangement allows much more flexibility in downtilt adjustment than does a two-sectored pattern.

Figure 3:
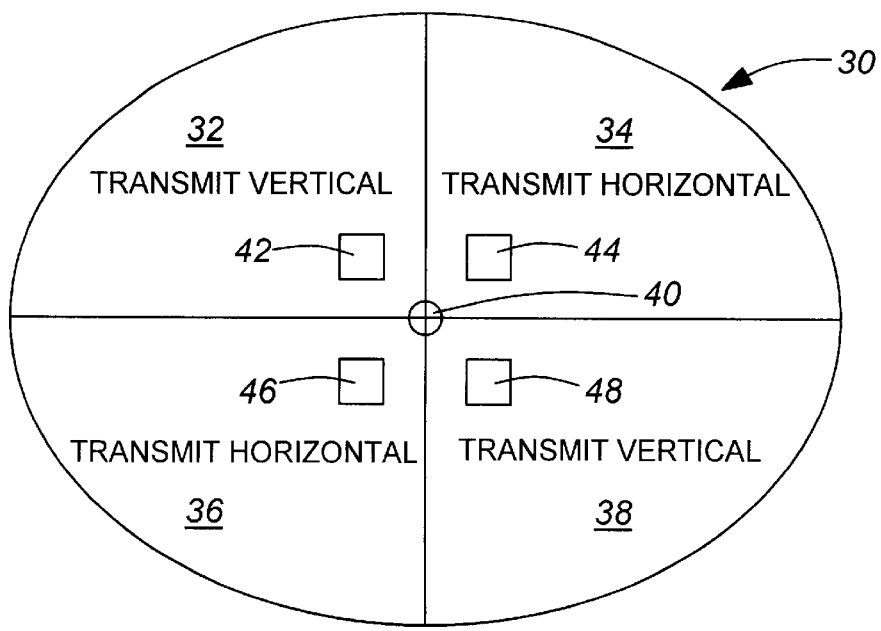
FIG. 3 shows a four-sectored cell with orthogonal transmit polarization.

A 4-sectored cell as contemplated by one aspect of the present invention is shown in FIG. 3. Conventionally, cells are shown as covering a circular area but it is to be understood that with antennas generating sectored radiation patterns the cell can take on a variety of configurations with a circle representing only one possibility. In FIG. 3 the cell area 30 is covered by transmission from base station 40. As shown, the cell 30 is divided into four sectors 32, 34, 36 and 38. Base station 40 includes directional transmitters 42, 44, 46 and 48 each configured to transmit into sectors 32, 34, 36 and 38 respectively. According to the present invention, the polarization of each sector is orthogonal to the polarization in adjacent sectors. Thus, as shown, radiation from transmitter 42 into sector 32 is vertically polarized, radiation from transmitter 44 into sector 34 is horizontally polarized, radiation from transmitter 46 into sector 36 is horizontally polarized and radiation from transmitter 48 into sector 38 is vertically polarized.

Figure 4:
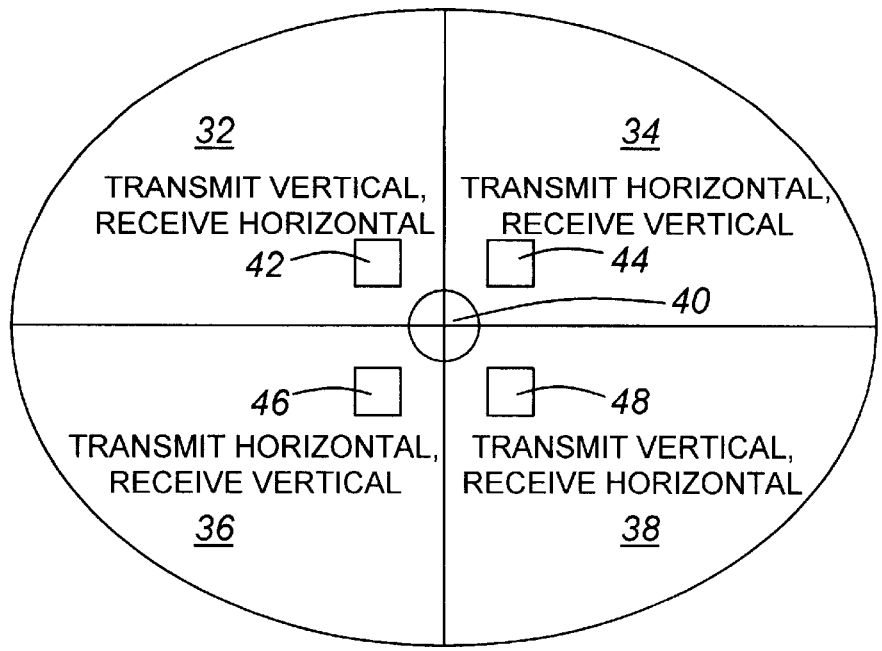
FIG. 4 shows the sectored cell of FIG. 3 for bi-directional communication.

Customer premise equipment for receiving a transmission from the base station is randomly located at fixed sites within each sector. It is, of course, contemplated by the present invention that transmission between base station and customer premise equipment (CPE) will be bi-directional. In order to provide greater isolation between sectors in the bi-directional mode communication between the base station and remote site (downlink) and communication between the remote site and the base station (uplink) is also orthogonally polarized. This is illustrated in FIG. 4. As shown, the downlink signal in sector 32 is vertically polarized and the uplink signal is horizontally polarized. As shown, the opposite applies in adjacent sectors.

Each transceiver at the remote site or customer premise equipment (CPE) is configured to receive only the specified polarization.

Figure 5:
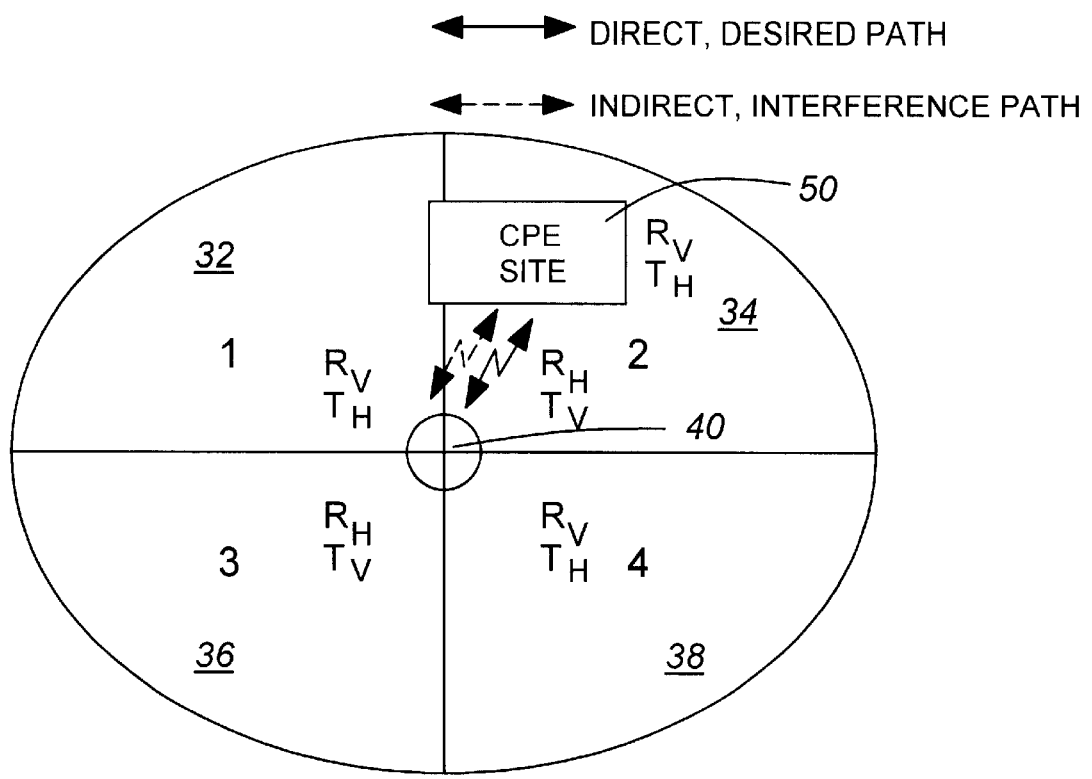
FIG. 5 illustrates sector isolation derived from the use of orthogonally polarized up/down link signals.

It will be apparent that the radiation pattern for each sector will have overlap in the boundary region. In FIG. 5, a remote site or CPE 50 is shown located in sector 34 but close to sector 32. Due to overlap some radiation from the transmitter associated with sector 32 will arrive at CPE 50. Because CPE 50 is configured to receive only the polarization intended for that sector, i.e. horizontally polarized radiation, vertically polarized transmission from the transmitter associated with base station 40 in sector 32 will be rejected by the cross-polarization rejection ratio which is typically in the order of 20–40 dB. This isolation allows customer sites located at or near the sector overlap points to achieve the adequate isolation needed for the reuse of the same frequency thereby allowing a higher reuse of the available radio license.

It is to be understood that highly directional antennas are used at the customer site 50 which allows the primary sources of signals to be largely restricted to transmissions from the base station sector antennas within the appropriate sector. A typical customer site antenna has a beam width in the order of 1.5 to 2.2 degrees. Since these signals arrive at the CPE 50 site on opposite polarization it is possible to orient the reception polarization of the site receiver such that it suppresses the undesired signal therefor allowing the required isolation (so-called inter-sector isolation). When the site 50 transmits back to the base station (in its uplink) the signal is orthogonally polarized such that only the base station receiver in the appropriate sector, i.e. sector 34 in FIG. 5, is properly polarized for the reception of this uplink signal. The equipment employed at the CPE site 50 can operate with a single antenna which employs dual orthogonal polarization even when the transmit and receive frequency bands are side by side with no gap (so-called receive-transmit separation).

Figure 6:
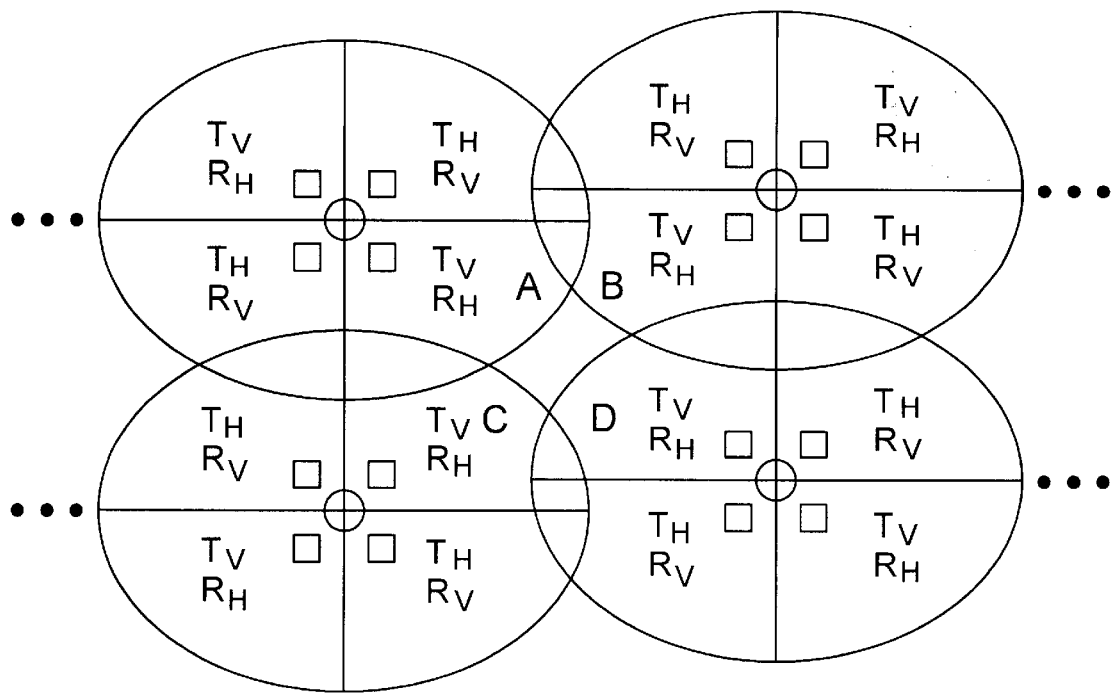
FIG. 6 illustrates an array of sectored, overlapped cell structures each employing polarization diversity to increase inter-cell isolation.

When a plurality of cells are used to provide continuous coverage of a given geographic region the cells may be arranged as shown in FIG. 6 which shows a portion of a larger metropolitan coverage scheme. Groups of sectors from four cells which "stare" at one another implement co-polarized transmit signals (downlinks). These are a group of sectors shown in FIG. 6 as A, B, C, D. These are then orthogonally polarized with respect to the receivers operating within the same group of "staring" sectors. This effectively suppresses base-to-base interference resulting from overshoot. Overshoot results when cell boundaries bulge when rain cells traverse a cell or sector and downlink power control algorithms attempt to compensate for added radio link losses.

The implementation of this scheme allows a high degree of intra-cell and inter-cell isolation i.e. both the up and down linked signals, which in turn allows the radio license to be reused extensively thereby increasing capacity. Typically, within an N sectored system where N=4 a 400% capacity increase is potentially available.

Figure 7:
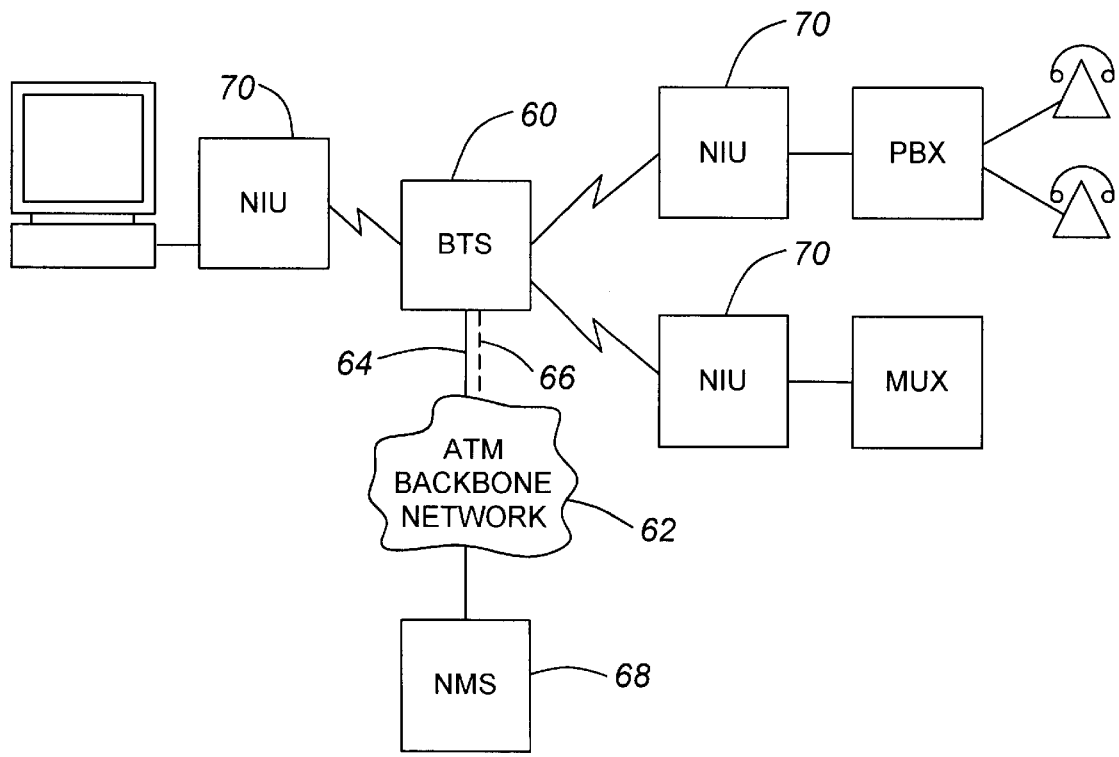
FIG. 7 illustrates an ATM network utilizing a base transceiver system (BTS) connected to an ATM or IP backbone with wireless links to network interface units (NIU) at remote locations.

One implementation of the concept of this invention is in connection with a broadband wireless network. A high level diagram of such a network is shown in FIG. 7. In this example base station or base transceiver station (BTS) 60 is connected to an asynchronous transfer mode (ATM) (or IP) backbone network 62 by either hard wire connections 64 or by a wireless point-to-point link as shown by line 66. The ATM (IP) backbone network is typically managed by a network management system 68. Network interface units (NIU) 70 are located at the customer premise and these will be in various sectors of the cell covered by BTS 60. Communication between BTS 60 and NIU 70 is by wireless link 72 and orthogonal polarization is used between sectors and within sectors as previously described. Connected to each NIU at a remote site will be various terminations such as a PBX, multiplexer, ethernet etc.

It is known that radio frequency (RF) transmission between the base station and NIUs is subject to attenuation due to weather conditions such as rain. This is commonly known as rain fade. According to ITU/CIR 530-4 horizontal linear polarization suffers a greater rain loss attenuation than vertical linear polarization. Thus, when considering the use of orthogonally polarized sectors, as previously discussed, the cell radius may become limited by the propagation loss experienced by the horizontal linear polarization in rain conditions.

Figure 8:
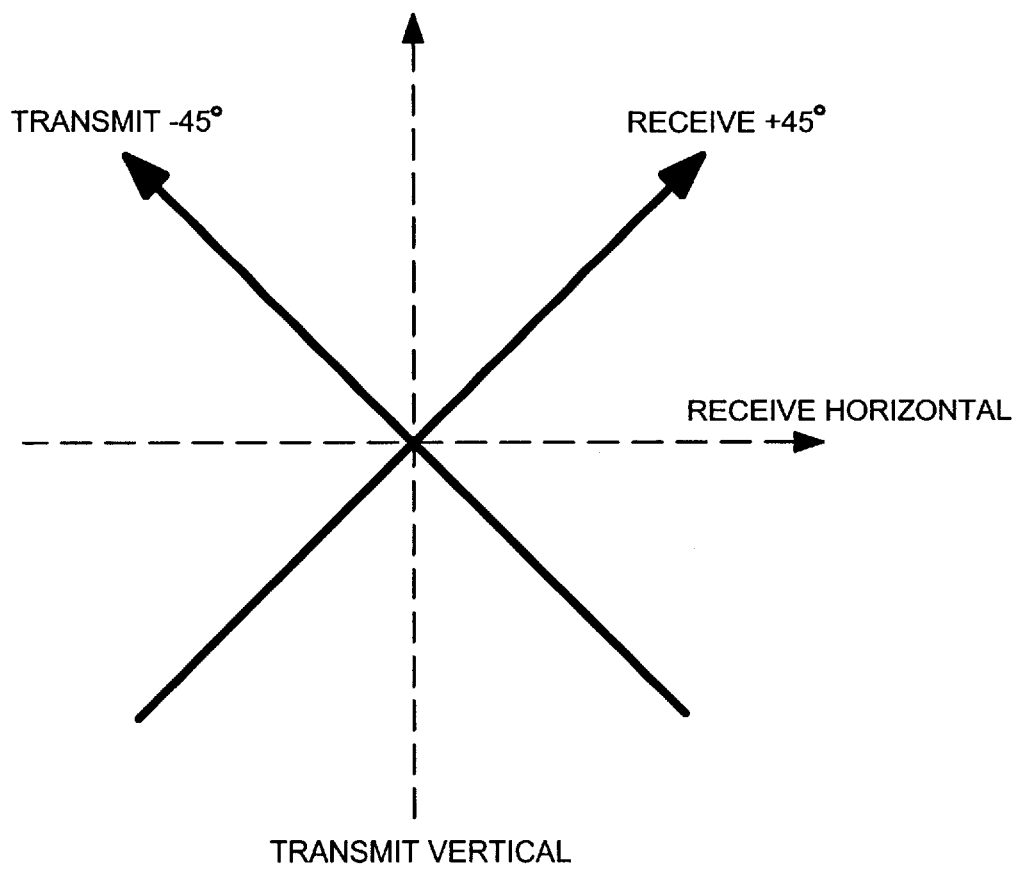
FIG. 8 illustrates the use of +/−45 degree orthogonal up and down links.

Thus, according to a further aspect of the present invention the cell radius can be optimized by retaining orthogonally polarized sectors but modified such that the respective polarizations are linear −45 degrees and +45 degrees (i.e. slant 45 degrees) as shown in FIG. 8. This technique allows the signal to see the average attenuation suffered by both the linear vertical and linear horizontal transmissions thereby improving radio range when compared to the worst case i.e. linear horizontal. It is to be understood that the configuration shown in FIG. 8 is exemplary only in as much as transmit and receive polarizations can be reversed, i.e. transmit polarization can be +45 and the receive −45. Also, combinations of receive and transmit polarization in the opposite sectors are contemplated.

As an example, under certain conditions it is possible to add approximately 2 dB to the 28 GHz radio link budgets when considering the +/−45 degree orthogonal approach when compared to using the linear horizontal/vertical scheme and calculating the budget based on the worst case, i.e. the horizontal mode.

While particular embodiments of the invention have been described and illustrated it will be apparent to one skilled in the art that numerous alternatives or variations can be implemented. It is to be understood, however, that such alternatives and variations will fall within the scope of the invention as defined by the appended claims.

What is claimed is:

1. A system for optimizing frequency re-use within a cell of a cellular wireless communications system comprising:

a base station within the cell and having a sectored antenna dividing the cell into four sectors, the sectored antenna transmitting point to multipoint communications to customer premise equipment (CPE) at sites within said sectors;

a directional antenna at each CPE for receiving communications from said sectored antenna and for transmitting point to point communications to said base station;

polarization means at said base station for transmitting and receiving orthogonally polarized radiation; and polarization means at said CPE directional antennas for receiving and transmitting orthogonally polarized radiation, said CPE directional antenna having a cross polarization rejection ratio in the order of 20 to 40 dB;

wherein orthogonally polarized radiation is employed between adjacent sectors and radiation between adjacent sectors have a common carrier frequency, wherein said orthogonal radiation comprises linear −45 degree polarization and linear +45 degree polarization relative to vertical linear.

2. A system as defined in claim 1 wherein said communications is broadband digital.

3. A system as defined in claim 2 wherein said communications system is an asynchronous transfer mode (ATM) network.

4. A system as defined in claim 3 wherein said base station is connected to an ATM backbone network.

5. A system as defined in claim 4 wherein said base station is hard wired to said backbone network.

6. A system as defined in claim 4 wherein said base station is connected to said backbone network via a wireless link.

7. A system as defined in claim 3 wherein said base station is connected to an Internet Protocol (IP) network.

8. A system as defined in claim 1 wherein a plurality of cells are adjacently arranged to cover a larger geographical area.

9. A method of optimizing frequency re-use within a cell of a cellular wireless communications system, said cell having a base station with a sectored antenna dividing the cell into four sectors, the sectored antenna transmitting point to multipoint communications to customer premise equipment (CPE) at sites within said sectors each CPE having a directional antenna for receiving communications from said sectored antenna and for transmitting point to point communications to said base station, the method comprising:

providing polarization means at said base station whereby said sectored antenna transmits and receives orthogonally polarized radiation;

providing polarization means at said CPE directional antennas for receiving and transmitting orthogonally polarized radiation said CPE directional antenna having a cross polarization rejection ratio in the order of 20 to 40 dB; and employing orthogonally polarized radiation between adjacent sectors said radiation between adjacent sectors having a common carrier frequency, said orthogonally polarized radiation comprising linear −45 degree and linear +45 degree polarization relative to vertical linear.

10. A method as defined in claim 9 for broadband digital communications over an asynchronous transfer mode (ATM) network.

11. A method as defined in claim 9 for broadband digital communications over an Internet Protocol (IP) network.

* * * * *